United States Patent [19]
Harnden, Jr.

[11] 3,742,175
[45] June 26, 1973

[54] INDUCTION COOKING APPLIANCE INCLUDING TEMPERATURE SENSING OF FOOD IN INDUCTIVELY HEATED VESSEL WITH IMMERSION-TYPE TEMPERATURE SENSING MEANS

[75] Inventor: John D. Harnden, Jr., Schenectady, N.Y.

[73] Assignee: General Electric Company, Schenectady, N.Y.

[22] Filed: Dec. 29, 1971

[21] Appl. No.: 213,349

[52] U.S. Cl............. 219/10.49, 73/351, 219/10.77, 219/504, 336/DIG. 2
[51] Int. Cl. ............................................ H05b 5/04
[58] Field of Search..................... 219/10.49, 10.77, 219/504; 340/210, 177; 73/362 AR, 351; 336/DIG. 2, 110

[56] References Cited
UNITED STATES PATENTS

| | | | |
|---|---|---|---|
| 3,710,062 | 1/1973 | Peters | 219/10.49 |
| 2,133,494 | 10/1938 | Waters | 219/10.49 |
| 3,530,499 | 9/1970 | Schroeder | 219/10.49 |
| 3,668,321 | 6/1972 | Lang | 336/DIG. 2 |
| 2,886,683 | 5/1959 | Klarittev | 73/362 AR |
| 3,268,880 | 8/1966 | Miller | 340/210 |
| 3,576,554 | 4/1971 | Temps et al. | 340/177 |

Primary Examiner—J. V. Truhe
Assistant Examiner—B. A. Reynolds
Attorney—John F. Ahern, Patrick D. Ward et al.

[57] ABSTRACT

Disclosed in an induction range having a counter with an uninterrupted top or working surface on which a cooking vessel is supported and inductively heated by an induction coil situated beneath the counter. Since only the cooking vessel is inductively heated, rather than the counter, the counter is relatively cool. In order to actually determine the temperature of foodstuff being cooked in the vessel there is provided a temperature sensing unit suitably encapsulated in an immersion-type thermistor unit to which there is attached flexible cable comprising thermistor leads or conductors. The thermistor unit is immersed in the foodstuff in the vessel. The flexible cable extends out of the cooking vessel and is terminated in a portable magnetic coupling device which, when resting on the work surface of the range counter, magnetically couples signals representing temperature correlated changes in the thermistor unit's impedance to a magnetic receptor device mounted below the range counter. Thus, temperature changes in the immersed thermistor unit are reflected as temperature correlated impedance changes to the magnetic receptor device and these impedance changes, in turn, are effective to help determine the true temperature of the foodstuff being cooked in the vessel.

12 Claims, 4 Drawing Figures

PATENTED JUN 26 1973 3,742,175

INDUCTION COOKING APPLIANCE INCLUDING TEMPERATURE SENSING OF FOOD IN INDUCTIVELY HEATED VESSEL WITH IMMERSION-TYPE TEMPERATURE SENSING MEANS

CROSS-REFERENCES TO RELATED APPLICATIONS

A fuller appreciation of induction cooking appliances, generally, as well as some of the sophistications which may be embodied therein is to be had by referring to the following U.S. patent applications: Ser. No. 200,526, filed Nov. 19, 1971, in behalf of David L. Bowers et al, titled SOLID STATE INDUCTION COOKING APPLIANCE; Ser. No. 200,424, filed Nov. 19, 1971, in behalf of J. D. Harnden, Jr. et al, titled SOLID STATE INDUCTION COOKING APPLIANCES AND CIRCUITS. The entire right, title and interest in and to the inventions described in the aforesaid patent applications, as well as in and to the aforesaid applications, and the entire right, title and interest in and to the invention hereinafter described, as well as in and to the patent application of which this specification is a part, are assigned to the same assignee.

BACKGROUND OF THE INVENTION

This invention pertains to induction cooking, generally; and, more particularly, to an induction cooking appliance, such as a range or stove, including cooking vessel supporting means, such as a counter, having combined therewith a temperature sensing unit for sensing, or detecting, the temperature of food in a cooking vessel supported by said supporting means.

Prior art electric ranges (i.e., those employing resistance heater surface elements) and gas ranges present many problems with respect to sensing, or detecting, the actual temperature of the food in a cooking vessel, or utensil, supported on the range counter and being heated. With such ranges, the usual approach is to attempt to directly detect, or sense, the temperature of the vessel. With such an approach, the temperature of the food being cooked in the vessel is determined indirectly. In prior art electric and gas ranges such an approach has not proved entirely satisfactory for the following reasons, among others:

First, with prior art electric and gas ranges, the temperature sensing means used was usually a contact type sensor which was placed in direct contact with the outer surface of the cooking vessel. Thus, the temperature sensing means was employed in such a way as to detect, or sense, the vessel temperature directly, rather than the temperature of the foodstuff being cooked therein.

Second, with prior art electric and gas ranges the primary heating source (e.g. the surface mounted electrical resistance coils or the gas fed flames) spuriously heats the temperature sensing unit and, moreover, other heated parts of the range thermally perturb the temperature sensing unit as well.

Third, in prior art electric and gas ranges because of the relatively high temperatures involved, principally because of the nature of the primary heating source and its proximity to the vessel-contacting temperature sensor, the materials from which the temperature sensing units and their associated components may be fabricated are rather restricted.

Fourth, in prior art electric and gas ranges, principally because of the high temperatures occasioned by the nature of the primary heating source and its proximity to the contact type temperature sensing units, effective thermal shielding, or insulation, is required.

Fifth, in prior art electric and gas ranges because of the severe thermal stresses created in the vessel contacting temperature sensing unit as a consequence of the high temperatures occasioned by the nature of the primary heating source and its proximity to the temperature sensing unit, relatively massive and sophisticated as well as somewhat mechanically complex spring arrangements and structures were required for the purpose of maintaining adequate contact between the temperature sensing unit and the cooking vessel.

Except for the first of the aforementioned reasons, which is self-explanatory, brief elaboration with respect to the other four reasons, hereinbefore set forth, follows:

In prior art electric and gas ranges the temperature sensing means and its associated components are directly heated, spuriously, in some measure by a high temperature primary heating source. For example, in the conventional electric range a temperature sensing unit is located at the center of a spirally wound resistance heating coil. This heating coil and the temperature sensing unit are both mounted on the top or working surface of the range counter. A cooking vessel rests on and contacts the heating coil as well as the temperature sensing unit. Although the temperature sensing unit directly contacts the heated cooking vessel, it is also subjected to direct spurious heating by the range's heating coil; e.g., by radiation and convection. In addition, the temperature of the temperature sensing unit is influenced by, among other things, the metallic counter of the electric range. Similarly in a gas range, the flames directly heat the temperature sensing unit. Moreover, heated metallic gridirons as well as the heated metallic counter top thermally influence the temperature sensing unit.

Also, in prior art electric and gas ranges, because of the nature of the primary heating source and its proximity to the temperature sensing unit, various component parts of the temperature sensing unit have to be fabricated with materials which are capable of withstanding relatively high temperatures; e.g., approximately 1,400°F – 1,600°F. For example, in the conventional prior art electric range wherein the temperature sensing unit is located at the center of the spiral resistance heating coil which is, in turn, mounted on the metallic counter top of the range, the temperature sensing unit and its associated components are subjected to the elevated temperatures hereinbefore set forth. Significant thermal stresses are, as a result, induced in the temperature sensing unit as well as in its associated components. Similar conditions occur in gas ranges.

In prior art electric and gas ranges, principally because of the nature of the primary heating source and its proximity to the temperature sensing unit contacting the cooking vessel, the temperature sensing unit as well as its associated components are required to have extensive thermal shielding, or insulation, for the purpose of minimizing the influences of spurious heating by the high temperature heating source as well as by the metallic range counter and metallic gridirons. Without some effective thermal shielding or insulation, the temperature sensing unit will provide a false indication of temperature unless temperature compensation is appropriately applied. However, such compensation is not feasible because of the wide range of cooking conditions. For example, it is very difficult to achieve a system in which both steady-state and transient, or dynamic, compensation is easily achieved. In any event, cooking performance is compromised. Moreover, without effective thermal shielding severe thermal stresses induced in the various component parts of the temperature sensing unit will cause a disabling, or sometimes destruction, of the temperature sensing unit.

The prior art temperature sensing units, especially those which are employed with the prior art electric ranges for the purpose of contacting the cooking vessel, are generally massive and are of a rather sophisticated and somewhat mechanically complex structure and arrangement. The high temperature environment within which the temperature sensing unit is located permits severe thermal stresses to be induced in the various components of the temperature sensing unit. These stresses tend to promote warping of the various components. For example, because of the aforesaid thermal stresses, a relatively massive double-spring arrangement is usually employed in combination with a temperature responsive device. The temperature responsive device, acting against spring restraint, contacts the bottom surface of the cooking vessel. The vessel rests on a flat spiral heating coil disposed on the top surface of the range counter. The massive double-spring arrangement is rather stiff and this is due in large part to the need to make the arrangement structurally resistant to thermal deformation. Such a spring arrangement generally functions satisfactorily to enable the temperature sensing unit to contact a relatively smooth flat-bottom surface of a relatively heavy cooking vessel such as a cast iron pot containing foodstuff to be cooked. Being in contact with the surface of the vessel, it is conceptually possible for the temperature sensing unit to detect the temperature of the vessel. However, in the event that a relatively light weight pot is used or if a pot having a rather irregularly contoured bottom surface is used, such prior art contact type temperature sensing units employing the aforesaid stiff spring arrangement proved unsatisfactory. For example, if a cooking vessel is used which is not sufficiently heavy, there will be an insufficient weight to adequately compress the spring arrangement. One consequence will be that the vessel will not rest on the resistance heating coil in the most intimate contact possible therewith. The cooking vessel will, as a result, be raised or tilted and thereby allow inefficient heat transfer between the resistance heating coil and the vessel.

SUMMARY OF THE INVENTION

Although the invention is hereinafter described and illustrated in the accompanying drawing figures as being embodied in an induction range, or stove, it is, nevertheless, to be understood that the invention's applicability is not limited to induction cooking ranges but may be embodied in, for example, portable counter top warming or cooking appliances, such as warming trivets, as well as in other types of induction heating apparatus which need not necessarily be used for cooking food.

One object of the invention is the provision of a cooking appliance having a temperature sensing unit for directly sensing or detecting the actual temperature of foodstuff in a cooking vessel or utensil being heated.

Another object of the invention is the provision of a cooking appliance having a temperature sensing unit for directly sensing or detecting the actual temperature of the foodstuff in a vessel or utensil being heated, said temperature sensing unit being free from spurious heating.

Another object of the invention is the provision of a cooking appliance including a temperature sensing unit for directly sensing or detecting the actual temperature of food in a vessel being heated, the materials of fabrication of said temperature sensing unit not being restricted by the elevated temperatures heretofore encountered in prior art electric and gas ranges.

Another object of the invention is the provision of a cooking appliance including a temperature sensing unit for directly sensing or detecting the actual temperature of food in a vessel being heated, said temperature sensing unit being capable of accurately sensing the temperature of the food in the vessel regardless of the weight of the vessel and/or the food therein and/or regardless of whether the vessel has or has not an irregular surface or contour; said temperature sensing unit not requiring the prior art spring construction or arrangement.

Another object of this invention is the provision of a cooking appliance including a temperature sensing unit for directly sensing the temperature of food in a vessel being heated; said vessel being supported by a vessel supporting means having an uninterrupted working surface.

The invention, illustratively embodied as hereinafter described, attains the aforementioned objects and others in that there is provided an induction cooking appliance, for heating a food-containing vessel having at least one portion thereof in which electric current can be induced to heat said one portion, comprising: vessel supporting means in which no substantial heating current is induced when said vessel supporting means is subjected to a changing magnetic field; an induction coil energizable for generating a changing magnetic field in said one portion of said vessel when said vessel is supported by said vessel supporting means; means for energizing said coil with electric power of at least ultrasonic frequency; temperature sensing means adapted to make contact with food in the vessel, said temperature sensing means including conductor means extendable from said temperature sensing means to a location outside the vessel; said temperature sensing means providing a change in electrical impedance corresponding to a change in the temperature of the food in the vessel; magnetic coupling means connected to said conductor means and adapted for being supported by said vessel supporting means at a location outside said vessel; magnetic receptor means supported by said vessel supporting means and magnetically coupled with said magnetic coupling means whereby changes in the impedance of said temperature sensing means are reflected to said magnetic receptor means through said magnetic coupling means; and, temperature signal processing circuitry coupled with said magnetic receptor means for providing a signal representative of the temperature of the food in the vessel corresponding to the temperature-correlated change in impedance of said temperature sensing means.

Other objects as well as a fuller understanding of the invention will appear by referring to the following detailed description, claims and drawing figures.

DESCRIPTION OF THE DRAWING FIGURES

DESCRIPTION OF THE PREFERRED EMBODIMENTS

Figure 1:
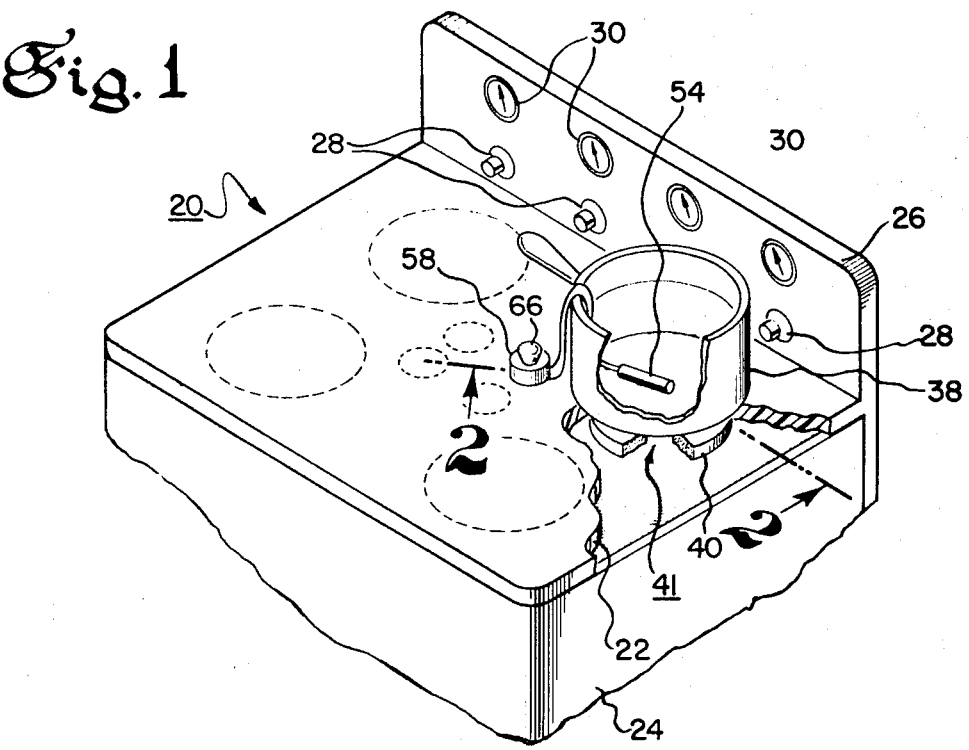
FIG. 1 is a perspective view of an upper part, partly cut away, of an induction cooking range showing, among other things, a range counter, a cooking vessel supported thereon and an immersion type temperature sensing means positioned within the vessel.

Shown in FIG. 1 is an induction cooking range designated, generally, by the reference number 20. The range 20 is provided with a counter 22 which is suitably supported on a range substructure 24. Fastened to the substructure 24 and located at the rear of counter 22 is a panel 26. As shown, on panel 26 there is mounted a number of controls 28 and a like number of dial type thermometers 30. On the top, or working, surface of the counter 22 there is illustrated four large diameter dotted line circles and four small diameter dotted line circles. The large diameter dotted line circles are intended to suggest locations where four cooking vessels 38 (e.g., pots, pans, etc.) may be positioned for cooking. The smaller diameter dotted line circles are intended to suggest locations for the placement of magnetic coupling means 58 which are part of the temperature sensing unit employed in the present invention. The temperature sensing unit is discussed in more detail with references to FIGS. 2, 3 and 4. Suffice it to say that: with each of the larger diameter dotted line circles whereat a cooking vessel 38 is to be located there is also associated an individual magnetic coupling means 58, a control 28 and a dial type thermometer 30.

Figure 2:
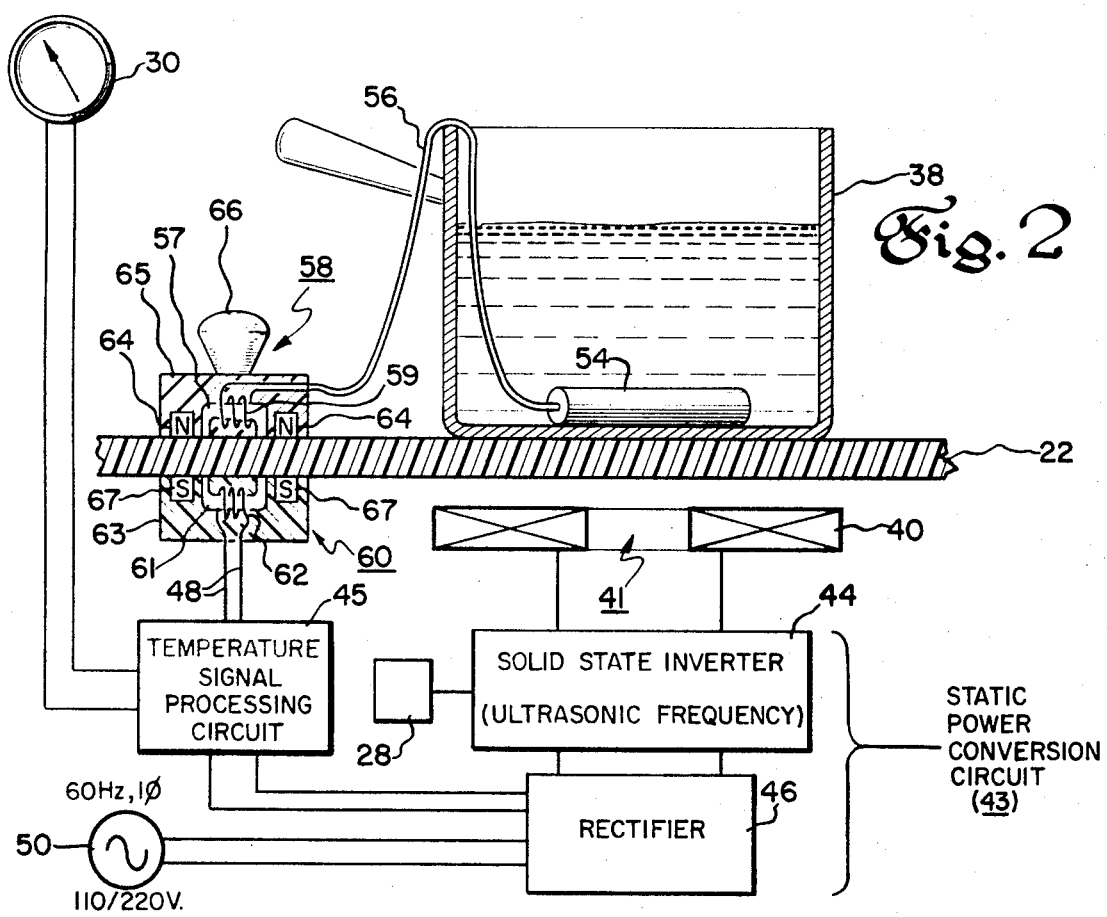
FIG. 2 is, in part, a block diagram of a portion of the induction cooking range of FIG. 1 as viewed along the section line 2–2' in FIG. 1 and showing, among other things, an enlarged cross section of the cooking vessel with the temperature sensing means therein.

Resting on the top, or working, surface of the counter 22 is a cooking vessel 38. As shown in FIGS. 1 and 2 there is located below the counter 22, and separated from the bottom surface thereof by an air gap, a flat spiral induction coil 40. The coil 40 has at the center thereof an air core designated, generally, by the reference number 41. The coil 40 is electrically coupled to the output of a solid state inverter 44 which is, in turn, electrically coupled to the output of a rectifier 46. The inverter 44 is a solid state inverter and as combined with the rectifier 46 forms a static power conversion circuit designated, generally, by the reference number 43. Rectifier 46 includes an input which is electrically coupled to a conventional A.C. source 50 which is a 60 Hz, single phase, 110 or 220 volt source. More specific details of the static power conversion circuit 43 including rectifier 46 and inverter 44 may be had by referring to the patent applications hereinbefore noted under the heading CROSS REFERENCES TO RELATED APPLICATIONS. Also shown in FIG. 2 is a control 28 which may, for example, be a switch which is electrically coupled with the inverter 44 for the purpose of controlling the flow of power to the induction coil 40. The association of control 28 and thermometer 30 is described in more detail hereinafter. The rectifier 46 may be a regulated full-wave bridge rectifier employing solid state devices and converting A.C. input power to D.C. output power. Moreover, the inverter 44 may employ SCR's which in performance of their control switching function enable the inverter 44 to deliver relatively high frequency (i.e., ultrasonic or above) output power to drive the induction coil 40. Also shown at FIG. 2 is a temperature signal processing circuit 45 which includes: a first input coupled to the rectifier 46 and deriving therefrom a source of D.C. voltage; a second input in the form of a pair of conductor means 48 extending from a magnetic receptor means 60 to the signal processing circuit 45; and, an output directly coupled to a dial type thermometer 30. The thermometer 30 may be suitably graduated in degrees F. or in degree ranges or bands.

Shown in FIG. 2 is a temperature sensing unit according to the invention which is comprised of: a temperature sensing means 54 which is adapted to be immersed in or to otherwise make contact with food in the vessel 38; conductor means 56 extending from the temperature sensing means 54 to a location outside the vessel 38; magnetic coupling means 58 connected to the conductor means 56 and, as shown, supported on the top or working surface of the counter 22; the magnetic receptor means 60 supported in the manner hereinafter described on the underside of the counter 22 and forming together with the magnetic coupling means 58 a completed magnetic circuit; the pair of conductor means 48; and, the temperature signal processing circuit 45 which, as shown, is electrically coupled with the magnetic receptor means by the pair of conductor means 48.

Details of construction as well as the functioning of the temperature sensing unit and its various components is discussed in detail hereinafter.

In the drawings the vessel 38 is illustrated as being filled with a liquified food which is to be heated. The vessel 38 is a conventional pot which may be made of cast iron, magnetic stainless steel, etc.; i.e., a metal, or alloy, which is electrically conductive as well as of sufficient magnetic permeability in which electrical heating current may be induced by action of the changing magnetic field produced therein by the induction coil 40. Because induction heating is employed vessel 38 only, and not counter 22, is heated. Vessel 38 is heated to a temperature of about 500°F. 550°F may, however, be considered to be a specification temperature in that the vessel 38 will not actually reach a temperature quite that high but when a safety factor is included 550°F is considered to be a nominal specification temperature. The counter 22, as a result, may be fabricated from materials which are not employable in the conventional prior art electric or gas ranges. For example, the counter 22 may be fabricated from epoxies, plastics, polymides, etc. If required for purposes of electrostatic shielding and/or structural enhancement and/or decoration, the counter 22 may include some metallic content. However, the inclusion of metallic material is necessarily limited to a small amount in order to enable substantially all of the power developed by the induction coil 40 to be coupled, electromagnetically, with the cooking vessel 38. If desired, the counter 22 may also be made of a glass which is suitably treated so that the glass may withstand temperatures of 550°F. Alternatively, quartz is another material of which counter 22 may be fabricated. Advantageously, the counter 22 presents as shown in FIG. 2 an uninterrupted working, or top, surface.

As indicated at FIG. 2 an individual control 28 and an associated dial type thermometer 30 is provided. The control 28 is electrically coupled with the inverter 44 and is intended, as stated hereinbefore, to control the power delivered by inverter 44 to the induction coil 40 which is instrumental in heating a vessel 38 located at one of the large diameter dotted line circles atop the counter 22. Control 28 may be graduated in degrees F so that the housewife can set control 28 to "call for" a certain temperature, or temperature range. However, it is the temperature graduated dial of the associated thermometer 30 which shows the actual temperature of the food being cooked in vessel 38. Moreover, the graduated dial on thermometer 30 indicates the rate of temperature rise and drop which is often very important information.

Temperature sensing means 54, as shown in FIG. 2, may be a thermistor probe unit; i.e., thermistor material which is suitably encapsulated. As one example, the temperature sensing means 54 may be comprised of thermistor material which is coated with glass frit and the glass frit enclosure is, in turn, encapsulated in a sheath which is both preferably electrically non-conductive and magnetically non-permeable to avoid the possibility that significant heating currents would be induced therein. The sheath may, however, be formed of an electrically conductive material having low resistivity, such as copper or aluminum. Since the magnetic field intensity in the region where the probe is located is relatively low (i.e., at a region on an axis with center of the induction coil) relatively insignificant heating current will be induced in the sheath. Also, the vessel 38 will have taken up most of the magnetic flux. Furthermore, the cross-section of the probe may be sized, by design, to reduce any tendency for circulating currents to occur. Moreover, the sheath should be able to withstand temperatures of 550°F without suffering deleterious effects. Moreover, the sheath should have relatively good thermal conductivity. Some material, among others, from which the sheath may be formed are glass, Teflon, or polymide materials, etc. treated to withstand 550°F. As indicated, electrical conductor means 56 is connected to the thermistor material within the temperature sensing means 54. The conductor means 56 may be comprised of a pair of stranded electrical conductors which are sheathed in a flexible tape-type cable. The cable may be a sheath of polymide material. Advantageously, the tape-type cable employs a sheath which is flexible and may easily be draped over the side of the vessel 38 as suggested in FIG. 2. The conductors employed have a small enough cross-section to be sufficiently flexible and, also, have sufficiently high resistivity to preclude significant temperature rise therein due to stray magnetic fields.

Figure 4:
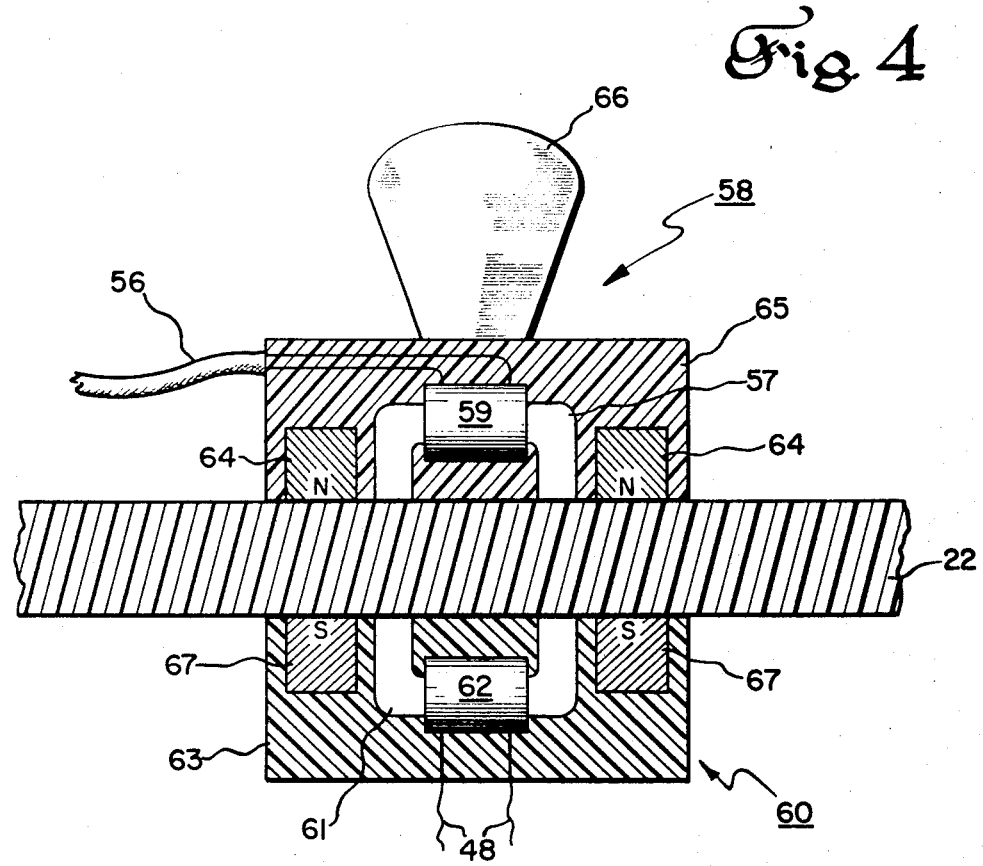
FIG. 4 is an enlarged cross section showing a magnetic coupling device and a magnetic receptor device which are part of a temperature sensing unit employed in the present invention.

As shown in FIGS. 2 and 4 an end of the conductor means 56 is connected to a magnetic coupling means which is designated, generally by reference number 58. The magnetic coupling means 58 is comprised of: a magnetic core 57; a coil 59 wound on core 57; permanent magnet means 64; a matrix 65 within which there is embedded, or potted, the core 57, coil 59 and permanent magnet means 64. The core 57 may be a U-shaped core or it may be a cup-type core. If the latter configuration is used the coil 59 will, of course, be differently arranged with respect to the core. One core material, among others which may be used, is high permeability ferrite. The permanent magnet means 64 may be in the form of a ring or it may be comprised of a number of separate permanent magnet units arranged or disposed in a ring concentrically encompassing the core 57. Barium ferrite permanent magnet material in ring form surrounding the core 57 and coil 59 is one preferred type of arrangement because the barium ferrite will effectively shield coil 59 and core 57 from stray magnetic fields, and barium ferrite is not easily demagnetized by external fields. The matrix 65 may be fashioned in the cylindrical form shown from suitable plastic or epoxy materials, among others.

The matrix material should be non-magnetic, non-conductive and capable of withstanding approximately 550°F. For convenience, a knob is provided so that the coupling means 58 may be easily handled and positioned on the surface of counter 22.

Also shown in FIGS. 2 and 4 is a magnetic receptor means designated, generally, by the reference number 60. The magnetic receptor means 60 unlike coupling means 58 is permanently secured to the underside of the counter 22. The magnetic coupling means 58 is, on the other hand, manually movable with respect to the top or working surface of the counter 22. Except for the knob 66 the magnetic receptor means 60 is similar to the magnetic coupling means 58. The magnetic receptor means 60 is comprised of: a magnetic core 61; a coil 62 wound on the core 61; permanent magnet means 67; and, a matrix 63 within which there is embedded, or potted, core 61, coil 62 and permanent magnet means 67. The core 61 may be a U-shaped core or it may be a cup-type core. If the latter configuration is used the coil 62 will be differently disposed, or arranged, with respect to the core 61. One core material, among others, which may be used is a high permeability ferrite. The permanent magnet means 67 may be in the form of a ring or it may be comprised of a number of separate permanent magnet units arranged in ring form concentrically encompassing core 61. Again, barium ferrite permanent magnet material in ring form surrounding the core 61 is one preferred type of permanent magnet material because the barium ferrite will effectively shield the coil 62 and the core 61 from stray magnetic fields. Similarly, the matrix 63 may be fashioned in the cylindrical form shown from suitable plastic or epoxy materials, among others. The matrix material should be non-magnetic, non-conductive and it should be able to withstand temperatures of 550°F.

The permanent magnet means 64 and 67 are magnetically polarized with N and S poles, respectively, as indicated in FIGS. 2 and 4 so as to enable the permanent magnet means 64 of the magnetic coupling means 58 to "latch" onto counter 22 by action of the permanent magnet means 67 of the magnetic receptor means 60. Thus, the magnetic coupling means 58 may easily be manually positioned directly over the magnetic receptor means 60, which is concealed from view of the housewife, by virtue of the latching and self aligning permanent magnet means 64, 67. When the magnetic coupling means 58 is so latched more or less directly over the magnetic receptor means 60 there will result an optimum coupling and alignment of changing magnetic flux between the cores 57 and 61.

Operationally, the temperature signal processing circuit 45 actively drives the coil 62 electrically with enery of a particular frequency; preferably at a frequency which is substantially different from the ultrasonic frequency at which the induction coil 40 is driven by inverter 44. A different frequency for driving coil 62 is preferred so that signals representative of food temperature can easily be descriminated from the frequency which drives coil 40. The coil 62 may be driven at frequencies which are higher or lower than those at which the induction coil 40 is driven. The coil 62 driven by the signal processing circuit 45 functions in a manner similar to that of a primary winding of a conventional transformer. The voltage impressed across coil 62 by the conductors 48, coupled with the processing circuit 45, causes current to flow through coil 62. This current flow is attended by an electromagnetic field. Since the voltage impressed across coil 62 is a changing voltage the current therethrough also changes as does the magnetic field. As a consequence, changing magnetic flux is introduced into the core 61. The changing magnetic flux in core 61 of magnetic receptor means 60 is coupled through the counter 22 to the core 57 of the magnetic coupling means 58. The changing magnetic flux in the core 57 induces a voltage across the coil 59. Thus, the coil 59 functions in a manner similar to that of the secondary winding of a conventional transformer. As hereinbefore described the temperature sensing means 54, and more particularly the temperature responsive thermistor material therein, acts as an electrical load which is connected via conductor means 56 to the coil 59. As the vessel 38 is inductively heated by induction coil 40, the heat is transferred to the foodstuff in the vessel and to the temperature sensing means 54. The thermistor material in temperature sensing means 54 changes its electrical resistance as a function of the temperature. In effect, there is impressed across the secondary winding, or coil, 59 a temperature-correlated resistive load. Hence, in terms of transformer theory current flow in the secondary winding, or in coil 59, will produce a magnetic flux which reacts with the magnetic flux produced by the primary winding or coil 62. In effect, the temperature-correlated resistive load developed by temperature sensing means 54 will be reflected back to the primary winding or coil 62. The reflected resistance, or impedance, is correlated with the temperature of the foodstuff in vessel 38. This reflected impedance as seen from the primary winding, or coil 62, may be employed to develop or modulate a signal in temperature signal processing circuit 45 so as to provide an output signal for driving thermometer 30. This output signal is representative of the temperature of the foodstuff in vessel 38.

Advantageously, the temperature sensing unit employing the means and operating in the manner hereinbefore described, and illustrated in the drawing figures, provides the induction range with the following features: the temperature sensing means 54 is an electrically passive device. Conductor means 56 is in the form of a rugged flexible cable, which as stated hereinbefore, can withstand the temperatures involved and it also provides an effective coupling of data as to the actual temperature of the food to a location remote from the food and, of course, remote from the cooking site. The barium ferrite permanent magnet means 64 and 67 effectively shield active components of the coupling means 58 and the receptor means 60 from stray magnet fields. Moreover, the use of permanent magnet means such as 64 and 67 with the polarities indicated in FIG. 4 enable the coupling 58 and receptor 60 to be positioned and magnetically coupled even though the receptor 60 cannot be seen by the housewife because of its position and the counter retains its desired unbroken work surface. As stated hereinbefore, the latching action of the permanent magnet means 64 and 67 enable the means 58 and 60 to be coupled at specified positions on the counter 22. Moreover, if cup-type cores are employed for the means 58 and 60 then precise alignment of the cores 57 and 61 is not absolutely necessary because of satisfactory alignment by the self-aligning magnets. There will be a sufficient coupling of the magentic flux between these cores to provide an accurate determination of temperature. Although permanent magnet means 64 and 67 have been described and illustrated, electromagnets may be employed if desired.

Figure 3:
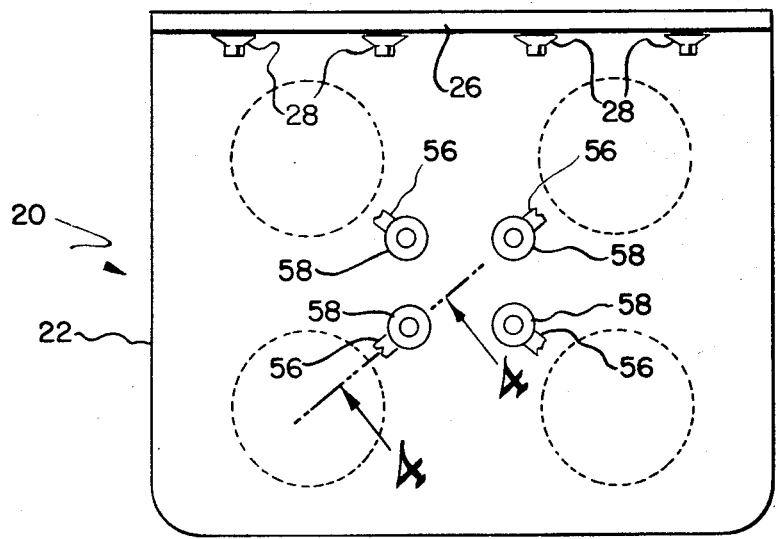
FIG. 3 is an enlarged plan view of the upper part of the induction cooking range of FIG. 1 showing, among other things, the location arrangement of portions of the temperature sensing units (e.g., magnetic coupling means) employed with this invention.

In FIG. 3 there is illustrated a plan view of the top, or working, surface of counter 22. As suggested, four magnetic coupling means 58 are positioned on top of the small diameter circles adjacent the large diameter circles, the latter circles indicating the positions of the various cooking vessels. Thus, four individual cooking vessels may have the temperature of the foodstuff cooking therein monitored simultaneously on four seperate thermometers 30 located on the panel 26 of the range 20.

It should be appreciated that the temperature sensing system herein disclosed may also be used with cooking appliances other than induction cooking appliances.

Although the invention has been described and illustrated by way of a specific embodiment thereof, it is to be understood that many changes in details of construction and in the combination and arrangements of parts and components, as well as changes in configurations and materials, may be made without departing from the spirit and scope of the invention as it is hereinafter claimed.

What is claimed is:

1. An induction cooking appliance, for heating a vessel having at least one portion in which heating current may be induced to heat said one portion whereby said one portion may heat food contained by said vessel, comprising: vessel supporting means in which no substantial heating current is induced when said vessel supporting means is subjected to a changing magnetic field; an induction coil energizable for generating a changing magnetic field in said one portion of said vessel to heat said vessel when said vessel is supported by said vessel supporting means; means for energizing said induction coil with electric power of at least ultrasonic frequency; temperature sensing means adapted to make contact with food in the vessel, said temperature sensing means providing a change in electrical impedance corresponding to a change in the temperature of the food in the vessel; conductor means connected with said temperature sensing means and extending therefrom to a location outside the vessel; magnetic coupling means connected to said conductor means and adapted for being supported by said vessel supporting means at a location outside said vessel; magnetic receptor means supported by said vessel supporting means and magnetically coupled with said magnetic coupling means supported by said vessel supporting means whereby changes in the impedance of said temperature sensing means are reflected to said magnetic receptor means through said magnetic coupling means; and, temperature signal processing circuitry coupled with said magnetic receptor means for providing a signal representative of the temperature of the food in the vessel corresponding to the temperature-correlated impedance of said temperature sensing means.

2. The induction cooking appliance according to claim 1 wherein said temperature sensing means is comprised of a thermistor unit.

3. The induction cooking appliance according to claim 1 wherein said conductor means is comprised of a flexible cable.

4. The induction cooking appliance according to claim 1 wherein said vessel supporting means includes an uninterrupted surface on which said vessel is supportable.

5. The induction cooking appliance according to claim 1 wherein said vessel supporting means includes an uninterrupted surface on which said vessel and said magnetic coupling means are supportable.

6. An induction cooking appliance according to claim 5 wherein said magnetic coupling means is portable and manually positionable on said surface so as to be coupled magnetically with said magnetic receptor means.

7. The induction cooking appliance according to claim 6 wherein said magnetic coupling means and said magnetic receptor means each include separate permanent magnet means and wherein said vessel supporting means includes another surface opposite said uninterrupted surface and separated therefrom by said supporting means, said magnetic receptor means being supported on said other surface, said permanent magnet means of the respective coupling and receptor means enabling said positionable coupling means and receptor means to be latched by magnetic force in a magnetically coupled relationship on the opposite surfaces of said vessel supporting means.

8. The induction cooking appliance according to claim 7 wherein said magnetic coupling means and said magnetic receptor means each include a magnetic core and a coil magnetically coupled with said core, said separate permanent magnet means providing, in addition, a magnetic shield for the cores and coils of the respective coupling and receptor means, said coil of said coupling means being connected with said conductor means and said coil of said receptor means being connected with said temperature signal processing circuitry.

9. The induction cooking appliance according to claim 8 wherein said temperature signal processing circuitry drives the coil of said receptor means with electrical energy having a frequency different from the frequency of the electrical energy which drives said induction coil.

10. An induction cooking range, for heating a vessel in which heating current may be induced to heat the vessel and food contained therein, comprising: a counter in which no substantial heating current is induced when the counter is in a changing magnetic field, said counter including first and second surfaces on opposite sides thereof; an induction coil energizable for generating a changing magnetic field in said vessel to heat said vessel and the food therein when said vessel is rested on said first surface of said counter; means for energizing said induction coil with electric power of at least ultrasonic frequency; a thermistor probe unit adapted for contacting the food in said vessel, said thermistor probe unit having electrical resistance which varies as a function of the temperature of the food in said vessel; flexible conductor means connected to said thermistor probe unit and extending from the probe unit to a location outside the vessel; portable magnetic coupling means manually positionable on said first surface of said counter and including a magnetic core and a coil magnetically coupled with said core, said flexible conductor means being connected to said coil of said magnetic coupling means; magnetic receptor means supported on said second surface of said counter and including a magnetic core and a coil magnetically coupled with said core, said magnetic coupling means being manually positionable with respect to said magnetic receptor means such that the magnetic cores of said coupling and receptor means are magnetically coupled although separated by the intervening counter; and, temperature signal processing circuitry including conductor means connected to the coil of said receptor means, said temperature signal processing circuitry providing a signal representative of the temperature of the food in the vessel corresponding to the temperature-correlated electrical resistance of said probe unit as said electrical resistance is reflected to said temperature signal processing circuitry through the magnetically coupled coils of said coupling means and said receptor means.

11. The induction cooking range according to claim 10 wherein said coupling means and said receptor means are further comprised of separate means for magnetically shielding the respective cores and coils of said coupling means and said receptor means.

12. A cooking appliance, for heating a food-containing vessel, comprising: non-metallic vessel supporting means; means for heating food in the vessel; temperature sensing means adapted to make contact with food in the vessel, said temperature sensing means providing a change in electrical impedance corresponding to a change in the temperature of the food in the vessel; electrical conductor means coupled with said temperature sensing means and extendable therefrom to a location outside the vessel; magnetic coupling means coupled with said conductor means and positionable at a location outside said vessel on said supporting means; magnetic receptor means adapted to be magnetically coupled with said magnetic coupling means at a location outside said vessel on said vessel supporting means whereby changes in the impedance of said temperature sensing means are electromagnetically translated to said receptor means; and, temperature signal processing circuitry coupled with said receptor means for supplying electrical energy to said receptor means and for providing a signal representative of temperature-correlated impedance of said temperature sensing means.

* * * * *